US006289346B1

(12) United States Patent
Milewski et al.

(10) Patent No.: US 6,289,346 B1
(45) Date of Patent: *Sep. 11, 2001

(54) APPARATUS AND METHOD FOR A BOOKMARKING SYSTEM

(75) Inventors: Allen E. Milewski, Red Bank; Thomas M. Smith, Plainfield, both of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,433

(22) Filed: Mar. 12, 1998

(51) Int. Cl.⁷ ........................................ G06F 17/30
(52) U.S. Cl. .................. 707/10; 707/3; 709/318; 725/50; 725/112
(58) Field of Search .................. 707/10, 3, 204; 348/6, 12; 345/327; 705/26, 27; 725/50, 51, 53, 56, 109, 110, 111, 112, 113; 709/318

(56) References Cited

U.S. PATENT DOCUMENTS

| 5,559,549 | * | 9/1996 | Hendricks et al. ............... 348/6 |
| 5,594,509 | * | 1/1997 | Florin et al. ................... 348/731 |
| 5,617,565 | | 4/1997 | Augenbraun et al. ............ 395/604 |
| 5,721,583 | * | 2/1998 | Harada et al. .................. 348/12 |
| 5,727,129 | * | 3/1998 | Barrett et al. .................. 706/10 |
| 5,815,145 | * | 9/1998 | Matthews, III ................. 345/327 |
| 5,818,935 | * | 10/1998 | Maa .............................. 380/20 |
| 5,832,223 | * | 11/1998 | Hara et al. .................... 395/200.47 |
| 5,907,322 | * | 5/1999 | Kelly et al. .................... 345/327 |
| 5,961,603 | * | 10/1999 | Kundel et al. .................. 709/229 |
| 6,018,764 | * | 1/2000 | Field et al. .................... 709/217 |
| 6,018,768 | * | 1/2000 | Ullman et al. .................. 709/218 |
| 6,021,433 | * | 2/2000 | Payne et al. ................... 709/219 |
| 6,055,567 | * | 4/2000 | Ganesan et al. ................ 709/219 |
| 6,061,719 | * | 5/2000 | Bendinelli et al. .............. 709/218 |

* cited by examiner

Primary Examiner—Thomas Black
Assistant Examiner—Uyen Le
(74) Attorney, Agent, or Firm—Kenyon & Kenyon

(57) ABSTRACT

A bookmarking system is provided that includes a user input device and a network server. A person who is viewing a program, e.g., watching a network news program on television, can bookmark an archived version of that program for future reference. The viewer utilizes the user input device to communicate to the network server the identity of the program of interest. The network server uses the identification information for the program of interest to identify a URL for the archived version of the program. The network server transmits the URL for the archived program to the personal computer of the viewer.

27 Claims, 2 Drawing Sheets

APPARATUS AND METHOD FOR A BOOKMARKING SYSTEM

BACKGROUND OF THE INVENTION

The present invention relates to a method and apparatus for searching for archived items of interest and bookmarking those items for future reference. More specifically, the invention provides for identifying a broadcast program of interest that is archived on a network and bookmarking the archived version of the program at a particular point during the broadcast.

Currently, it is possible to search for items of interest that are archived and available on the Internet and then bookmark those items for future reference. However, in order to bookmark the item of interest, the item must first be retrieved from the network on which it is archived. Usually this retrieval process is preceded by a search for the item. Searching for an item of interest presents drawbacks. For example, if a keyword search is conducted in the situations where either the Uniform Resource Locator (URL) of the particular item of interest is not known or where the searcher is not yet aware of a particular document that is of interest, the number of "hits" retrieved could be so extensive as to require the searcher to sift through the search results to find a particular item of interest. Thus, extensive searching may be required before a particular archived document is found and bookmarked for future reference.

Even if the searcher knows the specific URL of an item of interest, and is thus able to retrieve the item without extensive searching, current methods of bookmarking an item of interest present drawbacks. In order to bookmark an item, the viewer is required to identify the URL of the item so that its URL may be stored for future reference. This may be accomplished by either accessing the archived item from the network or by entering the specific URL for the item into the searcher's computer. In either case, the searcher must be using their computer to bookmark the item of interest. This presents drawbacks when the viewer of an item of interest desires to bookmark that item for future reference when the viewer's computer is not accessible.

Known bookmarking techniques have the further disadvantage that the searcher may have to review an entire item to view that particular part of the item that is of interest. For example, if a searcher is interested in viewing a particular story in a news program that is archived, the searcher may have to scan through the entire news program before they are able to find and view the particular story that they are interested in.

Therefore, it would be desirable to provide an improved method for searching for archived items of interest and for bookmarking those items of interest at particular locations within the item for future reference purposes.

SUMMARY OF THE INVENTION

The drawbacks in the prior art are overcome by the present invention for a bookmarking system. In accordance with the present invention, a user input device and a network server are provided. With the present invention, a person who is viewing a program, e.g., watching a network news program on television, can bookmark an archived version of that program for future reference at any particular location in the program. Therefore, in order to practice the present invention, the network news program, as well as being broadcast for viewing, must also be archived on a network for future access by the viewer.

As stated above, when viewing a broadcast program, the viewer of the broadcast program can bookmark an archived version of the program for future reference. The viewer utilizes a user input device to communicate to a network server the identity of the viewer, the identity of the program of interest, and the particular time of interest during the conduct of the program. The network server uses the identification information related to the program of interest to identify and locate the archived version of the program. The archived program is segmented into distinct segments. A unique URL is specified for each segment of the archived program. Using the time of interest of the viewer when viewing the broadcast program, as communicated to the network server, the network server is able to identify the specific URL that is associated with the particular archived segment of the program that is of interest to the viewer. Once the network server determines the URL for the segment of the program of interest, the server transmits this URL to the computer of the viewer. The viewer is thus able to bookmark this URL to access the archived program at a particular point of interest in the program for future reference.

In this manner, the present invention provides for easily locating an archived program of interest and bookmarking that program at a particular point in the program for future reference. The viewer of the program is not required to know the URL of the program of interest to locate the archived version of the program and the viewer is not required to have access to a personal computer to bookmark the program of interest. After the program of interest is bookmarked, the user is able to utilize their personal computer to access the program of interest through means that are well known in the art.

DETAILED DESCRIPTION

Figure 1:
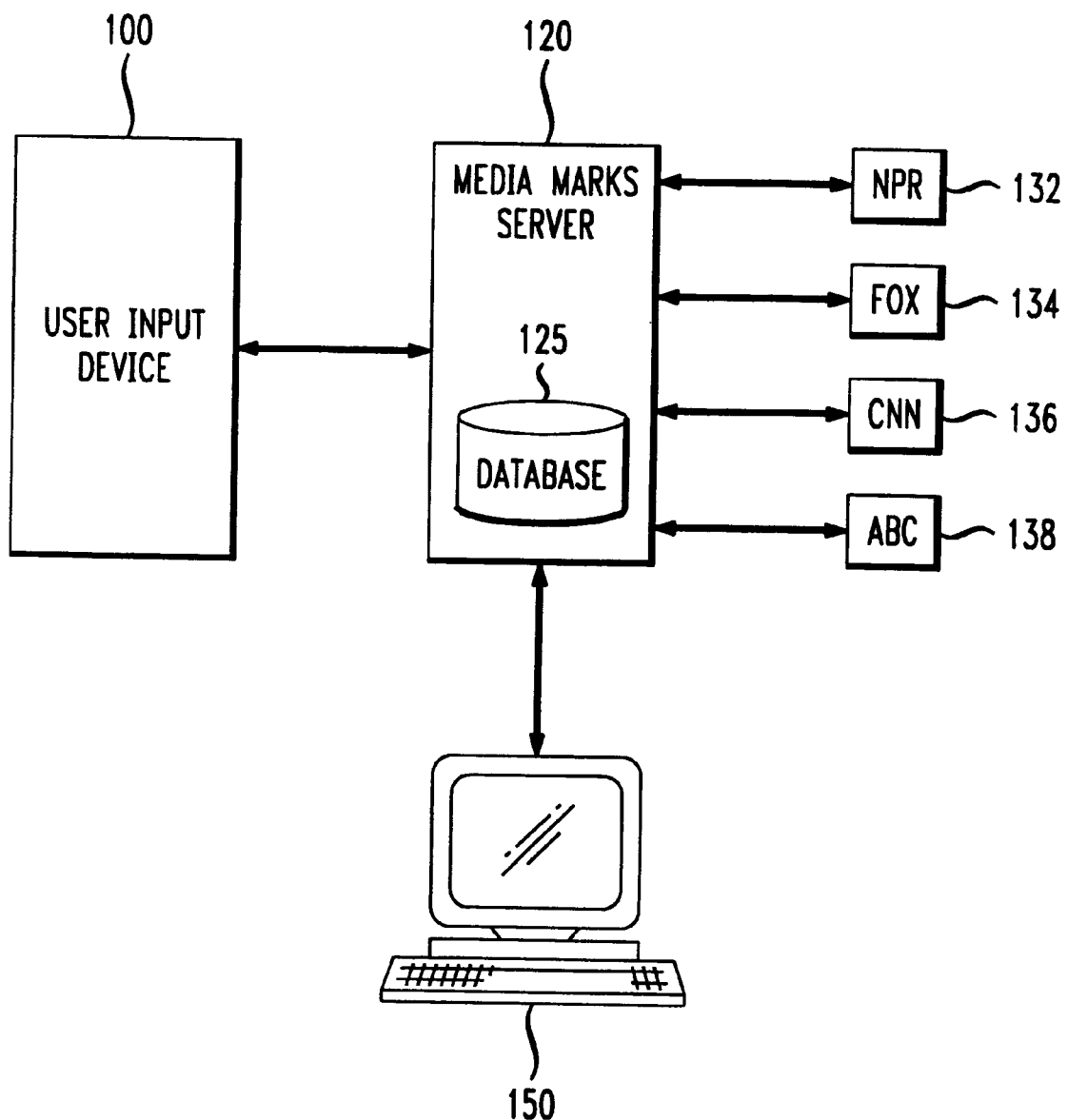
FIG. 1 illustrates an embodiment for the bookmarking system of the present invention.

FIG. 1 illustrates one embodiment for the bookmarking system of the present invention. As can be seen, a user input device 100, a "media marks" server 120, and a user's personal computer (PC) 150 are shown.

In practicing the present invention, a user of the media marks bookmarking system who is viewing a program of interest that is being broadcast over a transmission medium, e.g., television or radio, and who may want to view the program again at some later time, transmits information related to the program, as will be described in more detail later in this specification, to the media marks server 120 by using user input device 100. Media marks server 120 accesses database 125 to determine if the broadcast program of interest is also archived and available for viewing by accessing, for example, the Internet. If the program is archived, media marks server 120 will access the archived program by communicating with the archiving server and will obtain an archival address, which could be a URL, for the program. Media marks server 120 will then transmit the archival address for the program of interest to the user's PC 150 where the archival address will be bookmarked so that the program can be quickly accessed by the user for future reference. In this manner, the user is able to easily search for archived programs of interest and bookmark those programs for future viewing. A more detailed description for practicing the present invention will now be provided.

As discussed above, a viewer who is viewing a program of interest that is being broadcast over a transmission medium desires to have access to an archived version of that program for future reference. In order to determine if the program is archived and, if the program is archived, to obtain the URL for the program and bookmark the program, the user will utilize user input device 100 to communicate information to the media marks server about the program that the viewer is viewing over the broadcast medium. User input device 100 may be a two-way pager that is able to transmit information to media marks server 120 and receive information from server 120. The user will transmit a user identification code, the name of the broadcast network that is broadcasting the program of interest, and the time of day when the segment of the program of interest is being viewed, to media marks server 120 by utilizing two-way pager 100.

Two-way pager 100 can be utilized in well-known ways. The user of the two-way pager can program the pager so that input fields are provided by the pager for the user to input information related to the program of interest and the particular user to the pager. Alternatively, an optional feature can be provided for programming pager 100. Media marks server 120 can download a formatted message to pager 100 that can be stored by the pager and utilized by the user to input the information to be supplied to server 120. In this manner, the user is not required to program the pager, rather the media marks server provides a formatted message to the pager that can be utilized by the user to input information to the pager. Two-way pager 100 transmits the user identification information and the information related to the program of interest to the media marks server 120 as an electronic mail message or through other known methods.

As mentioned above, the user will input information to pager 100 for transmission to media marks server 120 that identifies the program of interest and the user. The user enters the name of the network broadcasting the program, e.g., CNN, ABC, etc., and the date and time of day that the segment of the program that the viewer is interested in is being broadcast. The time of day is desirable because if the viewer is only interested in viewing one particular news story that is included in an hour-long news program, the time that the particular news story of interest was broadcast will allow the media marks server to bookmark the archived news program at that particular location in the program so that the particular story of interest will be bookmarked for the user and thus the user won't have to view the entire archived news program in order to view the particular story of interest. This process will be described more fully later in this specification.

The user also sends identification information related to the user to media marks server 120 so that the service can identify the user and access the user's profile which is stored in database 125. The user profile contains information related to the user, which will be described below.

After the user transmits the information described above to media marks server 120, server 120 will utilize the information to access database 125. The server will utilize the user identification information to identify the electronic mail address of the user so that, if the program of interest is archived, the server is able to send the URL of the archived program to the user's PC 150 so that the program can be bookmarked for future reference. Alternatively, server 120 could send the URL directly to a personalized web page of the user.

Additionally, user identification information is utilized to allow the media marks server to properly identify the program of interest of the user. As such, database 125 contains information related to the broadcast programming schedules in the user's geographic location. For example, two viewers interested in the same particular program that is broadcast on the same network, e.g., the second half of a football game, would be viewing the program at different local times if one viewer was in California and one viewer was in New Jersey. Therefore, the time of the start of the second half of the football game that is transmitted to the media marks server by each viewer would be, for example, 5:30 PM by the viewer in New Jersey and 2:30 PM by the viewer in California, even though each viewer was interested in the same program broadcast on the same network. Therefore, the server must be able to correlate the local time of the viewer to the programming schedule of the broadcast network in order to accurately determine the program that the local viewer was viewing on the broadcast network at the local time of interest.

Other information related to the viewer that may be required by server 120 to accurately determine the program of interest that the local viewer is viewing is the preferred local broadcast channel for the broadcast network. For example, National Public Radio (NPR) is a broadcast network that may be carried locally on several different local radio stations and the programming at any given time on these local radio station outlets for NPR may be different. Therefore, if a listener transmits a time of, for example, 1:45 PM for NPR to server 120 and the programming for NPR in the local area is different for two local outlets for NPR, if the server is not able to determine which outlet the listener is listening to the server is not able to accurately determine the program of interest for the listener. Therefore, database 125 contains information related to the user for the preferred outlet for each program. Therefore, if the user designates that they are interested in a program broadcast by NPR at 1:45 PM, server 120 can accurately determine the exact program that the listener is interested in because the server knows which outlet station the listener heard the program on and the programming schedule of NPR on that outlet station.

The user information that is stored in database 125 may be entered into database 125 in a variety of ways. The user can input the information upon subscribing to the service or can update the information by utilizing PC 150 which is connected to server 120. The present invention is not limited to any particular method of providing information to database 125.

Database 125 also contains information about the availability of archived programs. As such, database 125 contains information that allows server 120 to determine whether a particular program has been archived or is scheduled to be archived. As discussed above, this information can be provided to database 125 in a variety of ways. For example, the service provider that offers the media marks service could enter the information into database 125 after consultation with the broadcast networks. Alternatively, the broadcast networks could directly provide information to server 120 for storing in database 125 related to archived programs. Again, the present invention is not related to any particular method of providing information to database 125 related to archived programs.

Upon receipt of the network identity information and the time of viewing a particular segment of a program of interest, server 120 will access database 125 to determine if the program broadcast on that network at that time is archived or scheduled to be archived. If the program is not archived or scheduled to be archived, server 120 will transmit a message to two-way pager 100 to indicate that the program is not available. If the program is archived, server 120 will communicate with the archiving server to access a pointer to the URL of the archived version of the program of interest. If the program has not yet been archived, but database 125 contains information that indicates that the program is scheduled to be archived, network server 120 will store the information from the user related to the program and will periodically access database 125 to determine when the program has been archived. Server 120 will query database 125 at programmed time intervals to check for the status of archiving the program. The interval can be determined by either defaulting to a time-period parameter stored in server 120 or can be specified by the user and contained in the user profile that is stored in database 125.

FIG. 1 illustrates archiving servers 132, 134, 136, and 138, which archive programs that are broadcast on NPR, FOX, CNN, and ABC, respectively. The archived programs are stored on the archiving servers by the network broadcast providers through well-known means. Archiving servers 132, 134, 136, 138, and the particular networks identified, are illustrative only and the present invention is not limited to accessing only this number of archiving servers or the particular identified networks. The present invention is able to be practiced with any number of archiving servers and any broadcast network programmer that archives their programs.

Media marks server 120 will utilize the information transmitted to it by the user to access the archiving server and to access the particular program of interest at the particular time of interest and determine the URL for the program at the particular time of interest in the program. As such, each program that is archived must be segmented into discrete portions and a unique URL must be associated with each discrete portion. In this manner, when the user designates a particular portion of a program of interest by transmitting the time of broadcast of the portion of interest to the media marks server, the media marks server is able to determine a URL for the particular portion of interest in the archived program.

There are several methods available for designating unique URLs for discrete portions of an archived program. The present invention is not limited to any particular method of designating URLs for particular portions of an archived program. All that is required is that the media marks server associate the time of broadcast for the portion of the program of interest to the URL for that portion of the archived program. In this manner, the archived portion of the program of interest can be easily retrieved by the user for future reference by bookmarking the URL associated with the archived portion of the program.

One method for designating URLs for particular portions of archived programs is to use an algorithm that monitors the "fade outs" in a broadcast program, e.g., the commercial breaks. The algorithm would segment the broadcast program by utilizing the fade outs in the program. Each segment between fade outs would be assigned a unique URL. Therefore, by knowing the time of interest for a particular portion of a program, and therefore knowing when this portion of interest occurred in relation to the start of the program, server 120 could access the segmented portion of the archived program that correlated to the time of interest and retrieve the URL for this segment of the program. This methodology is disclosed in the commonly owned pending U.S. patent application Ser. No. 08/679,976, filed Jul. 15, 1996, titled "Method for Providing a Compressed Rendition of a Video Program in a Format Suitable for Electronic Searching and Retrieval." This patent application is incorporated by reference herein in its entirety.

A second method for assigning URLs to segments of an archived program is to assign URLs to each separate topic in the archived program. For example, in an archived news program, each news story could be assigned a separate URL. Again, by knowing the time of interest for a particular portion of a program, and therefore knowing when this portion of interest occurred in relation to the start of the program, server 120 could access the segmented portion of the archived program that correlated to the time of interest and retrieve the URL for this segment of the program.

Again, the present invention can be practice with any method of assigning URLs to archived program segments. All that is required is that server 120 associate the time of interest in the broadcast program to the archived segment of the program for this time of interest in order to determine the URL for this segment of interest.

Once the media marks network server 120 obtains a URL for the archived segment of interest, server 120 transmits this URL to the user's PC 150 or to a personalized web page of the user. Server 120 can transmit this URL to PC 150 by sending an electronic mail (e-mail) message to the user's PC. As discussed previously, database 125 contains the e-mail address for the user. Once this URL is received at PC 150, the URL may be bookmarked for future reference. In this manner, the user will be able to easily access a particular portion of an archived program of interest without requiring the user to search for the program or search for the particular segment of interest in the program.

Figure 2:
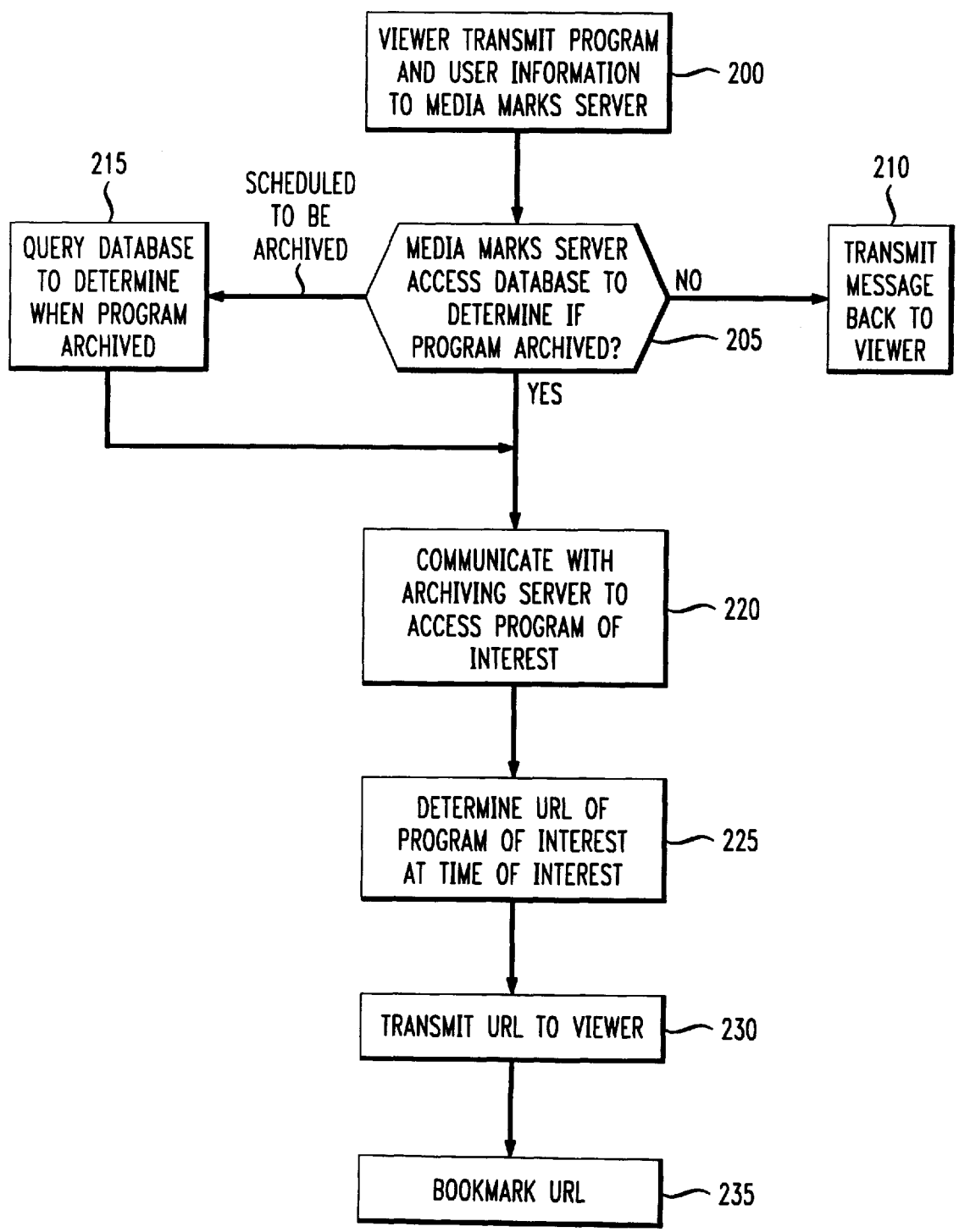
FIG. 2 illustrates a process flow chart for practicing a method in accordance with an embodiment of the present invention.

The basic method steps for practicing the present invention are illustrated in FIG. 2. As shown, step 200 is the step where the viewer of a broadcast program transmits identification information about the viewer and the broadcast program to the media marks server. In step 205, the media marks server accesses the database to determine if the broadcast program of interest is archived on a separate medium. If the program is not archived, the server will notify the viewer that the program is not available for bookmarking, step 210. If the program is not yet archived but is scheduled to be archived, the server will query the database at programmed time intervals to determine when the program has been archived, step 215. After the program has been archived, or if the program was already archived in response to step 205, the media marks server will communicate with the archiving server to access the archived version of the broadcast program of interest, step 220. In step 225, the media marks server determines the URL of the archived program of interest at the particular time of interest in the program. The media marks server then transmits the URL to the viewer, step 230, where the URL may be bookmarked for future reference by the user, step 235.

The method steps shown in FIG. 2 are not intended to be all inclusive of all of the features of the present invention, as described in this specification. The specification, when read as a whole, fully describes the bookmarking system of the present invention.

Several variations on the disclosed embodiments are contemplated. In the disclosed embodiments, the user input device 100 is disclosed as a two-way pager, however, alternative apparatuses for the user input device may be used in the present invention. For example, a telephone can be utilized as the user input device. If a telephone were utilized, the telephone keypad could be utilized to input the user identification information and the program identification information. The user would dial into the media marks server and could be prompted by the server to input the required information. The same information that was described previously in this specification could then be input to media marks server 120 by utilizing the telephone keypad.

Alternatively, the telephone could be utilized as the user input device by having the user orally communicate the required information to the media marks server. In this embodiment, the server would contain known voice recognition software to convert the user's spoken inputs to data that would then be processed by the server as previously described.

Other devices could be utilized as well for the user input device. For example, a personal data assistant (PDA) could be utilized. The user could enter the required information into the media marks server from the PDA by utilizing the PDA's keypad. Additionally, a web browser could be utilized as the user input device.

A broadcast receiver could also be utilized as the input device. For example, a radio with a two way communications device installed within the radio could be utilized to transmit information to the media marks server. Because the radio would know what station the radio was tuned to, the transmitted signal to the server from the radio, or other receiver, e.g., television, could automatically transmit this station information to the server. Therefore, there would be no need for the user to generate this information for transmission to the server. The receiver could also be programmed such that the user's identification code and the time of transmission could be embedded in the transmitted signal to the media marks server, along with the station identification information. In this manner, when a listener is listening to a radio program that they would like to be able to access for future reference, by pushing a single button to transmit a signal to the media marks server, the present invention can automatically bookmark the program for the listener.

It is also not required that a separate user input device be utilized. The user could utilize the user's PC 150 to transmit the required information to the media marks server.

In the disclosed embodiment, the media marks server 120 transmitted the URL of the program segment of interest to the user's PC 150 as an e-mail message. However, the present invention does not require that the URL be provided to the user in this manner. Alternatively, the URL can be provided to a web page that is established for each user and is maintained on media marks server 120. If the URL entry is provided to the user on a web page rather than as an electronic mail message, it is easier for the user to add descriptive data concerning the URL to the URL entry. This descriptive data could be utilized for a variety of purposes, one of which is to assist the user in associating a particular URL with a particular program segment of interest at some time in the future when the reason for the interest in the program may not be so fresh in the memory of the user.

Additionally, if URLs are stored on a web page, the user can perform a narrowly tailored search for a particular term or subject of interest by searching only the URLs stored on a particular web page. For example, if a particular web page stores URLs for programs of interest that relate to legal topics and the user wants to find a particular program that discusses a particular legal topic, but yet the user does not remember what program contains the information they desire, the user could perform a search for the information by searching only those URLs stored on the web page. A search performed as outlined above could not be accomplished if the URLs were stored on a PC as e-mail messages.

The use of the web page described above for storing URLs could be utilized with any of the user input devices previously described. As an added feature, when inputting data to the media marks server for bookmarking a program of interest, the user could also input the descriptive data discussed above for inclusion on the web page once the URL is determined and stored on the web page. If a telephone was utilized, again the user could speak the descriptive data and the server would convert the speech to text and store the text on the web page and associate the text with the URL. Thus, the user is not limited to adding descriptive text only after the URL is stored on the web page by using PC 150, but rather can add descriptive text upon transmission of the program information to the media marks server and by utilizing a variety of user input devices.

There are many ways that the time of day when the segment of the program of interest is being viewed can be determined by the media marks server and the present invention is not limited to any particular methodology. For example, the viewer can directly transmit the time of viewing the segment of the program of interest to the media marks server by using the user input device or the time of interest can be indirectly determined by the media marks server. For example, the user can directly provide the time to the server by entering the time into the user input device and transmitting this time data to the media marks server. Alternatively, when the user transmits an electronic mail message to the media marks by utilizing, for example, the two-way pager, the mail server that sends the electronic mail message to the media marks server will provide the time of sending the message, which correlates to the time that the viewer is viewing the item of interest, to the media marks server. In this manner, the viewer is not directly inputting the time of viewing the program of interest to the media marks server, rather, the message sent to the media marks server by the viewer contains time data related to the segment of the program of interest and this time data is used by the media marks server, as disclosed. It is not even required to transmit any time data to media marks server. Media marks server could contain a clock and, upon receipt of an input from a viewer, media marks server could utilize the time of receipt of the input from the viewer to determine the time of interest of viewing the program segment of interest. Again, the time of receipt of the input from the viewer would correlate to the time that the viewer is viewing the item of interest.

The disclosed embodiments are illustrative of the various ways in which the present invention may be practiced. Other embodiments can be implemented by those skilled in the art without departing from the spirit and-scope of the present invention.

What is claimed is:

1. A method for searching for an archived version of a broadcasted item of interest comprising the steps of:

displaying said broadcasted item of interest on a broadcast television network to a viewer;

querying a data network to determine whether said broadcast item of interest is archived;

providing identification information for said broadcasted item of interest and the viewer to a data network server;

identifying an archival address for said archived version of said broadcasted item of interest, said archived version of said broadcasted item of interest substantially replicating said broadcasted item of interest, and said archived version of said broadcasted item of interest being stored on a data network;

notifying the viewer of said archival address; and transmitting said archival address for said archived version of said broadcasted item of interest to the viewer.

2. The method of claim 1 further comprising the step of bookmarking said archival address on a personal computer of the viewer.

3. The method of claim 1 wherein said step of providing identification information for said broadcasted item of interest includes providing information specifying a particular segment of said broadcasted item of interest.

4. The method of claim 3 wherein said information specifying a particular segment of said broadcasted item of interest is a time of viewing said particular segment.

5. The method of claim 1 wherein said step of providing identification information for said broadcasted item of interest to said data network server comprises the step of sending an electronic mail message to said data network server.

6. The method of claim 1 wherein said step of providing identification information for said broadcasted item of interest to said data network server comprises the step of orally communicating said identification information to said data network server.

7. The method of claim 1 further comprising the step of storing said archival address on a web page.

8. The method of claim 1 further comprising the step of storing said archival address on a personal computer.

9. The method of claim 7 further comprising the step of providing information associated with said archival address to said web page.

10. The method of claim 1 wherein said archival address for said archived version of said item of interest is a URL.

11. An apparatus for bookmarking an archived version of a broadcasted item of interest comprising:

a database resident in a data network server, said database containing information related to availability of said archived version of said broadcasted item of interest stored on an archiving data network, said archived version of said broadcasted item of interest substantially replicating said broadcasted item of interest, said network server adapted to search said database determining whether said broadcast item of interest is archived and notifying the viewer of said archival address;

a data network interface, said data network interface contained in said data network server and providing interconnection to the archiving data network; and a user input device, said user input device communicating with said data network server to provide identification information for the broadcasted item of interest and the viewer of the broadcasted item of interest wherein the viewer is viewing the broadcasted item of interest on a broadcast medium separate from said archiving data network.

12. The apparatus of claim 11 wherein said user input device is a two-way pager.

13. The apparatus of claim 12 wherein said data network server includes voice recognition software.

14. The apparatus of claim 13 wherein said user input device is a telephone.

15. A method for bookmarking an archived version of a broadcast program of interest comprising the steps of:

receiving, at a data network server, identification information for a broadcast program of interest broadcasted on a broadcast network, said identification information including information specifying the broadcast network on which said broadcast program of interest was broadcasted and specifying a time of broadcast of said broadcast program of interest;

querying a database to determine whether said broadcast program of interest is archived; determining an archival address for said archived version of said broadcast program of interest, said archived version substantially replicating said broadcast program of interest and said archived version stored on an archiving data network; and bookmarking said archival address.

16. The method of claim 15 wherein said step of bookmarking said archival address comprises the step of storing said archival address on a personal computer.

17. The method of claim 15 wherein said step of bookmarking said archival address comprises the step of storing said archival address on a web page.

18. The method of claim 15 wherein said step of receiving identification information for said broadcast program of interest at said data network server comprises the step of receiving an electronic mail message at said data network server.

19. The method of claim 15 wherein said step of receiving identification information for said broadcast program of interest at said data network server comprises the step of orally receiving said identification information at said data network server.

20. The method of claim 15 wherein said information specifying said time of broadcast of said broadcast program of interest identifies a particular segment of said broadcast program of interest and said archival address is associated with said particular segment of said broadcast program of interest.

21. The method of claim 16 further comprising the step of periodically accessing a database contained in said data network server to determine when said broadcast program of interest has been archived.

22. A method for searching for an archived segment comprising the steps of:

receiving, in a data network server, segment identification information for a broadcasted segment of a broadcast program, wherein said broadcasted segment was broadcasted on a broadcast medium, and wherein an archived version substantially replicating said broadcasted segment is archived in a data network;

querying the data network to determine an archival address for said archived version of said broadcasted segment, wherein said archived version is accessible via said archival address;

receiving viewer identification information for said viewer in said data network server;

identifying a viewer address for said viewer;

notifying said viewer if an archival address does not exist; otherwise, transmitting said archival address for said archived version of said broadcasted segment to said viewer address.

23. The method of claim 23 wherein said broadcast medium is a television broadcasting medium, wherein said broadcast program is a television broadcast program broadcasted on a television broadcast network, and wherein said data network is the Internet.

24. The method of claim 23 wherein said segment identification information include data identifying said television broadcast network, said television broadcast program, and additional information specific to said broadcasted segment.

25. The method of claim 24 wherein said additional information pertains to the subject of said broadcasted segment.

26. The method of claim 24 wherein said additional information pertains to the time of broadcast of said broadcasted segment.

27. The method of claim 22 wherein said determining step further comprises the step of providing said segment identification information to a database in said data network server and retrieving said archival address based on said segment identification information.

* * * * *

UNITED STATES PATENT AND TRADEMARK OFFICE
CERTIFICATE OF CORRECTION

PATENT NO. : 6,289,346 B1  
DATED : September 11, 2001  
INVENTOR(S) : Milewski et al.

It is certified that error appears in the above-identified patent and that said Letters Patent is hereby corrected as shown below:

<u>Title page,</u>
Item [56], U.S. PATENT DOCUMENTS, please add
-- 5,321,396 Lamming et al. 6/1994 .......... 340/825.49 --

Signed and Sealed this

Twenty-second Day of July, 2003

JAMES E. ROGAN
*Director of the United States Patent and Trademark Office*